F. H. MOYER.
DUAL TIRE RIM CONSTRUCTION.
APPLICATION FILED SEPT. 18, 1912.
1,116,464.
Patented Nov. 10, 1914.
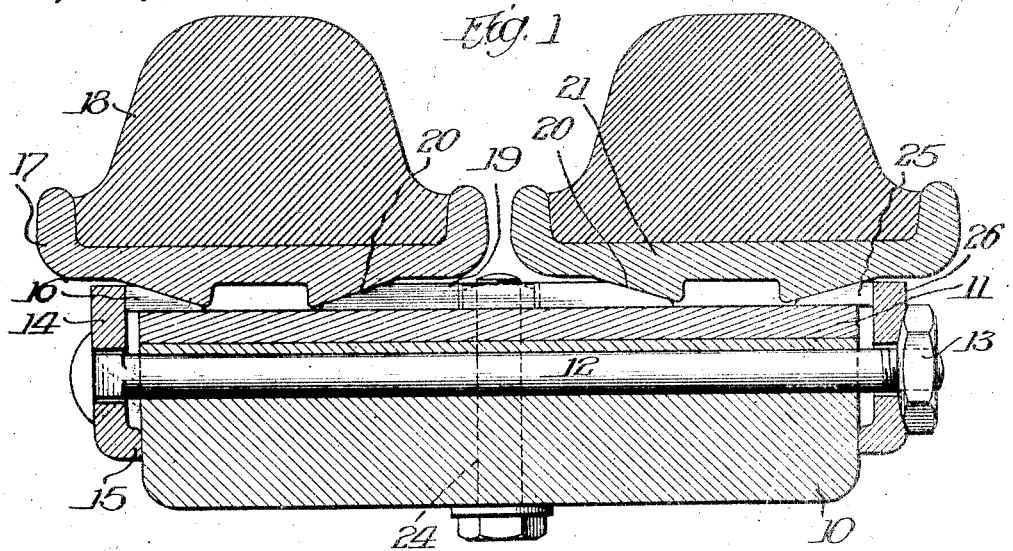
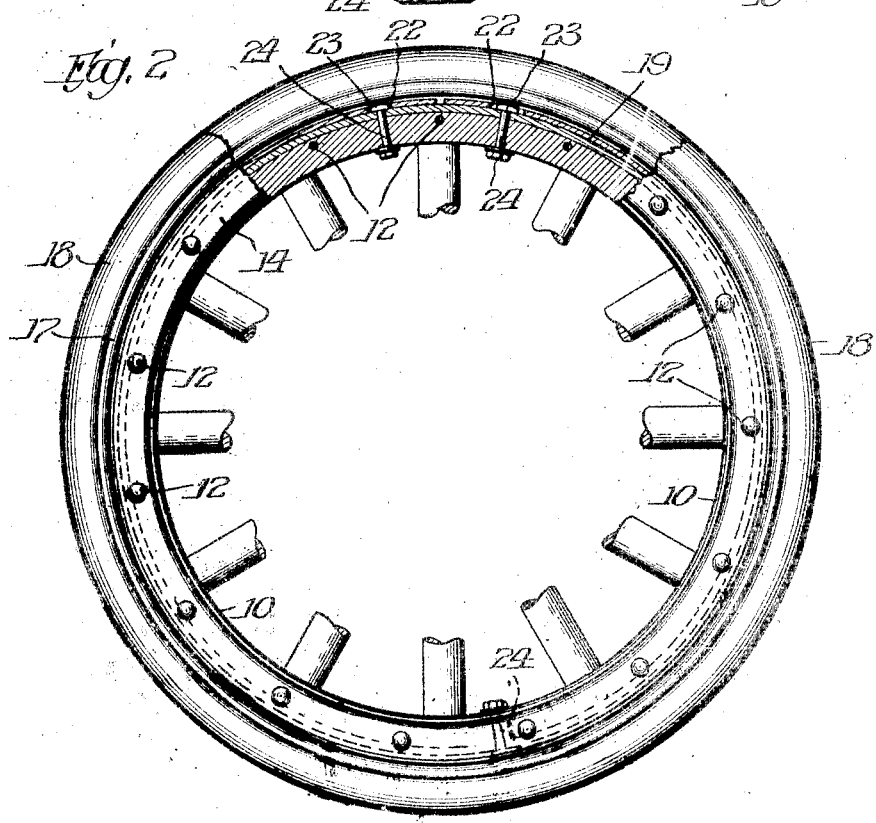

UNITED STATES PATENT OFFICE.

FREDELLIA H. MOYER, OF AKRON, OHIO, ASSIGNOR TO THE FIRESTONE TIRE & RUBBER COMPANY, OF AKRON, OHIO, A CORPORATION OF OHIO.

DUAL-TIRE-RIM CONSTRUCTION.

1,116,464.      Specification of Letters Patent.      Patented Nov. 10, 1914.

Application filed September 13, 1912. Serial No. 720,915.

*To all whom it may concern:*

Be it known that I, FREDELLIA H. MOYER, a citizen of the United States, residing at Akron, in the county of Summit and State of Ohio, have invented certain new and useful Improvements in Dual-Tire-Rim Construction, of which the following is a specification.

My invention relates to wheels and has particular reference to a novel dual-tread cushion wheel and the means for attachment of the tires and rims to the felly.

In the construction of dual tread cushion tire wheels it is customary to mount the tires on rigid metallic rims; then secure the rims to the felly of the wheel by means of bolts. Of course, the rims must fit the felly and much difficulty is experienced in applying the rims without first removing the wheel from the axle. The felly is usually provided with a center supporting ring which serves as a spreader or spacer for the two cushions. This ring is usually tight fitting and cannot be bolted to the felly without removing the wheel in case it becomes necessary to remove the inner tire. The practice therefore has been to first place the inner tire, then force on the middle ring, then the second tire, finally tightening the rims in place by means of the bolt passing through the felly. Because of the inclined surfaces against which the force of the bolt is exerted, the proper locating of the rims and the center ring is difficult; that is, the component of the force exerted by the bolt on the wedge shaped surfaces is resolved into transverse components and very little into forces in line with the bolt.

I have conceived the idea of a dual tread wheel so constructed that both tires and their rims may be removed from the front of the wheel and replaced with ease. By my construction the center ring is properly centered and the effect of the clamping bolt is the same on both rims. This is something which was not possible with the arrangements in use heretofore for the reason that the clamping effect would be exerted on the first tire and rim and with little effect on the inner rim. Thus the tires were frequently not centered with relation to the felly. In my construction the bolt is loosely fitted in the felly instead of being driven through as is common in such cases. Being thus loosely fitted, the clamping effect will be the same on both sides of the rim. In the former construction where the bolt was not loosely fitted the clamping action would take place on the outer rim only, leaving the inner rim rather loose and permitting creeping or circumferential travel which would ultimately wear out the rim and wheel parts.

The invention will be more fully understood by reference to the accompanying drawings, wherein, Figure 1 is a transverse section of a wheel constructed in accordance with my invention, and, Fig. 2 is a side elevation partially in section, showing a complete wheel minus the hub.

Referring more particularly to the drawings it will be seen that the felly 10 of the wheel is provided with a metallic peripheral band 11, on which the rims of the tires are seated. The felly is apertured to accommodate a plurality of fastening bolts 12, having nuts 13, as is customary. It will be noted that the apertures are slightly larger than the fastening bolts 12, thus providing a loose fit by means of which the clamping action of the bolt is the same on both the head and nut ends thereof.

In my construction I provide an inner clamping flange 14, having an annular flange 15, adapted to contact the felly 10. A clamping ring 16, which is discontinuous or split, is fitted on the metallic outer portion 11 of the felly and is adapted to be contacted by the clamping flange or ring 14. The upper surface of the ring 16 is wedge-shaped and is adapted to contact the angular base of the removable rim 17. This rim carries the cushion tire 18. A center band 19 is provided, this band being likewise discontinuous or split, and has on its edges oppositely disposed angular surfaces 20. These surfaces coöperate with corresponding angular surfaces on the bottoms of the rims 17 and 21. The center band 19 is provided with a plurality of elongated apertures 22, within which is seated the heads 23, of bolts 24. It will be seen that the bolts 24 have no function as clamping means but merely maintain the center band in proper alinement. Because of the slots the band may be contracted by the clamping action of the bolts 12 on the rims but may not be displaced transversely. An outer clamping ring 25 is similar in construction to the ring 16 and is contacted by a clamping flange 26, corresponding to the flange 14 on the inner edge of the wheel except that this flange is provided with a round instead of squared opening for the bolt 12 and has a cupped countersink to accommodate the hemispherical bearing face of the nut 13.

In order to assemble a pair of tires and rims such as shown in Fig. 1, the inner clamping flange 14 is located, the bolts 12 being passed therethrough and through the felly; next the clamping ring 16, which is split, is located; next the rim 17 containing the tire is slipped in place; then the center bend 19 is properly positioned. After being positioned, the bolts 24 are located with the nuts 23 seated in the slots 22; next the rim 21 is slipped in place and this is followed by the outer clamping ring 25, which is also split. The clamping flange 26 and the nuts 13 on the bolts 12 complete the assembling. The nuts 13 are then screwed home and the operation is complete. The tires are removed by reversing the operations just described. It will be seen that the tightening process is equalized as to both rims; that is, a force tending to clamp the two rims against the center bolt 16 is applied equally to both tires due to the fact that the centering ring is properly centered and immovable transversely before the tightening process begins. This, as heretofore described, is particularly advantageous and results in uniformity of wear and transmission of load.

It is obvious that modifications may be made in the construction shown and such modifications I consider within the scope of my invention.

I claim:

1. In a dual tread wheel, the combination of a felly, a split centering ring having an elongated aperture therein, a removable stop projected through said felly and into said aperture, said stop holding said ring against transverse movement but permitting limited circumferential movement, a pair of rims, and means for clamping said rims against said centering ring, substantially as described.

2. In a wheel, the combination of a felly, a split centering ring having a plurality of apertures therein, bolts projecting through said felly into said apertures and arranged whereby said centering ring is held against transverse movement but permitted limited relative circumferential movement, a pair of tire rims having portions contacting said centering ring and means for clamping said rims on said felly, substantially as described.

FREDELLIA H. MOYER.

Witnesses:
K. M. ANDREW,
O. E. LOOMIS.